US007711957B2

(12) United States Patent
Brockhaus et al.

(10) Patent No.: US 7,711,957 B2
(45) Date of Patent: *May 4, 2010

(54) GRANTING ACCESS TO A COMPUTER-BASED OBJECT

(75) Inventors: Hendrik Brockhaus, Unterbiberg (DE);
Andreas Furch, Freising (DE);
Kay-Christian Wondollek,
Oberschleissheim (DE)

(73) Assignee: Siemens Aktiengesellschaft, Munich (DE)

( * ) Notice: Subject to any disclaimer, the term of this patent is extended or adjusted under 35 U.S.C. 154(b) by 1070 days.

This patent is subject to a terminal disclaimer.

(21) Appl. No.: 10/574,180

(22) PCT Filed: Sep. 20, 2004

(86) PCT No.: PCT/EP2004/052244

§ 371 (c)(1),
(2), (4) Date: Mar. 30, 2006

(87) PCT Pub. No.: WO2005/033913

PCT Pub. Date: Apr. 14, 2005

(65) Prior Publication Data

US 2007/0038589 A1    Feb. 15, 2007

(30) Foreign Application Priority Data

Sep. 30, 2003   (DE)   ................. 103 45 486

(51) Int. Cl.
*H04L 9/00*    (2006.01)

(52) U.S. Cl. .................................................. 713/172
(58) Field of Classification Search ................. 713/172, 713/176, 173, 165, 167, 180; 380/282, 285
See application file for complete search history.

(56) References Cited

U.S. PATENT DOCUMENTS

| 5,999,626 | A | * | 12/1999 | Mullin et al. ............... 713/172 |
| 6,868,404 | B1 | * | 3/2005 | Ono et al. ..................... 705/55 |
| 6,873,706 | B1 | * | 3/2005 | Miyazaki et al. .............. 380/30 |
| 2001/0021251 | A1 | * | 9/2001 | Kasai ......................... 380/201 |
| 2002/0029347 | A1 | | 3/2002 | Edelman |
| 2003/0161473 | A1 | | 8/2003 | Fransdonk |
| 2004/0132437 | A1 | * | 7/2004 | Ohmori et al. ........... 455/414.1 |
| 2005/0132186 | A1 | * | 6/2005 | Khan et al. .................. 713/165 |

FOREIGN PATENT DOCUMENTS

| EP | 0 686 906 A2 | 12/1995 |
| EP | 0 803 789 A2 | 10/1997 |
| EP | 1 055 990 A1 | 11/2000 |
| EP | 1 076 279 A1 | 2/2001 |
| EP | 1 191 419 A2 | 3/2002 |

* cited by examiner

*Primary Examiner*—Beemnet W Dada

(57) ABSTRACT

Disclosed is a memory card comprising a program code processor for granting access to a computer-based object, at least one public and private key that is allocated to the memory card as well as a public key of a trustworthy entity being stored on said memory card. Furthermore, a piece of license information comprising at least one license code which is encoded by means of the public key allocated to the memory card is provided on an arithmetic unit that controls access to the computer-based object.

11 Claims, 1 Drawing Sheet

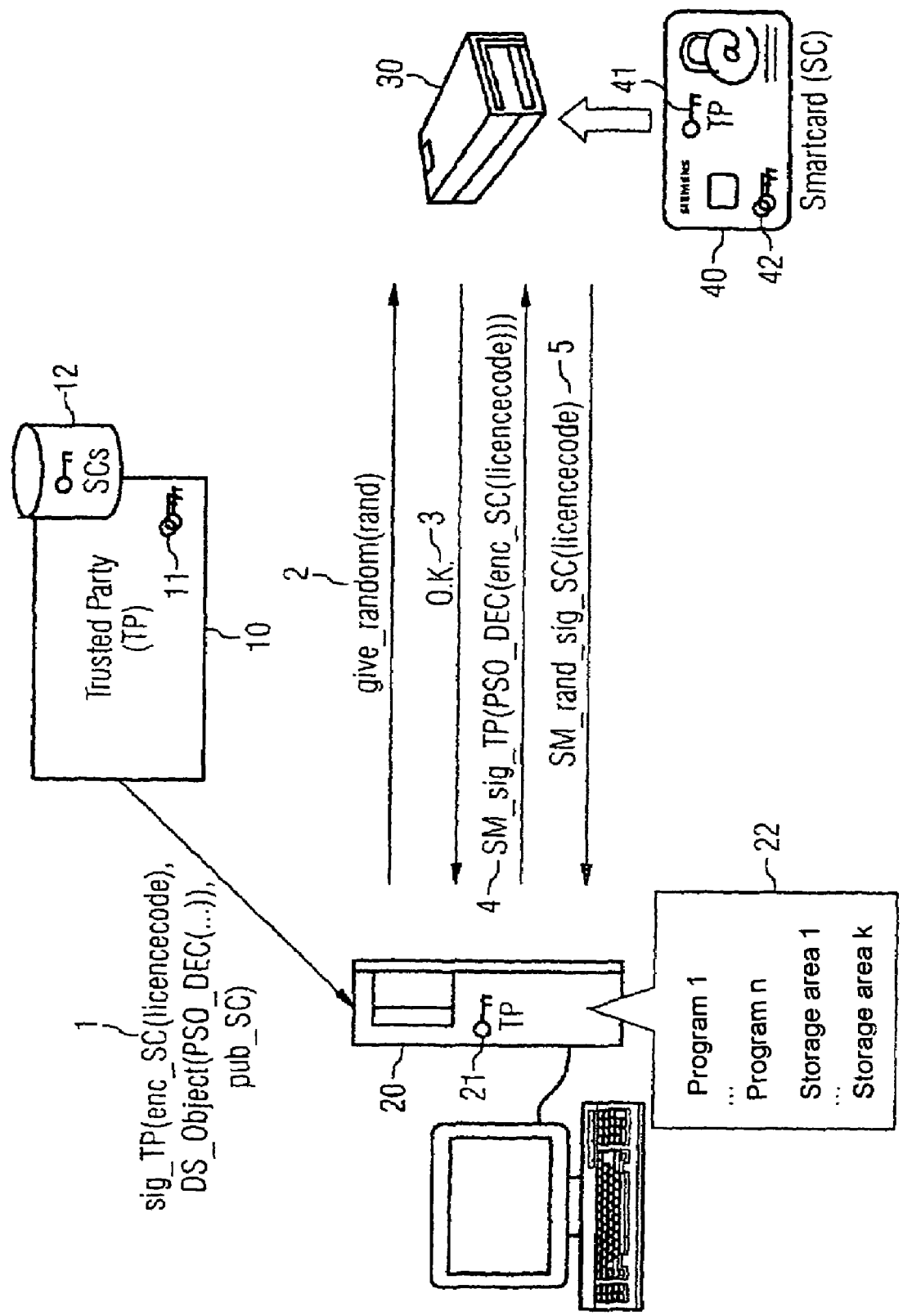

GRANTING ACCESS TO A COMPUTER-BASED OBJECT

CROSS REFERENCE TO RELATED APPLICATIONS

This application is the US National Stage of International Application No. PCT/EP2004/052244, filed Sep. 20, 2004 and claims the benefit thereof. The International Application claims the benefits of German application No. 10345486.1 filed Sep. 30, 2003, both of the applications are incorporated by reference herein in their entirety.

FIELD OF THE INVENTION

The present invention relates to a method for granting access to a computer-based object and to a control program for implementing said method.

BACKGROUND OF THE INVENTION

Immense losses are incurred worldwide through the unauthorized use of computer programs. In order to counter these, solutions are developed for protecting computer programs against unauthorized access.

A transmission of encoded information for activating a computer program serves to prevent unauthorized reproductions of the computer program being made. Corresponding methods serve, for example, also as a technical prerequisite for marketing computer programs as products via e-commerce. In previously known methods for activating computer programs, computer programs are released with the aid of a respective registration key. In order to release a computer program, the registration key, which is permanently assigned to a computer program license, is input manually or imported from a data carrier. Particularly where there is a plethora of computer programs installed on different computers, this results in a high administrative outlay which is associated with personnel-intensive operating and maintenance work.

From EP 1 191 419 A2 a method is known in which predeterminable functions of a computer program can be released for a selectable period of use through modification of a registration key pair. The registration key pair has at least one piece of partial information blocked against user access. The functions to be released do not necessarily have already to have been available for release when the computer program was initially installed but can also be selected for addition subsequently. For the release, no deployment of operating or maintenance personnel is required at the location of the computer on which the respective computer program is installed.

Components of the registration key pair according to the method described in EP 1 191 419 A2 are application information and an application value. The application information is input on a first computer on which the computer program to be registered is installed, or is generated by said first computer. The application value is computed in a second computer from the application information by means of coding.

When a computer program is registered or when the registration is changed, first pieces of application information comprising at least one piece of partial information that is blocked against user access are transmitted to the second computer. In the second computer, an application value is computed from the first pieces of application information, said application value subsequently being transmitted to the first computer. By means of decoding, second pieces of application information are determined in the first computer from the application value. When execution of the computer program begins, the first and the second pieces of application information are checked as to whether they match. Depending on the deviations that arise in the checking, predeterminable functions of the computer program are released.

SUMMARY OF THE INVENTION

The object of the present invention is to specify a method which offers increased protection against unauthorized use of resources provided in an arithmetic unit as well as an implementation suitable for carrying out the method automatically.

This object is achieved according to the invention by a method and a control program comprising the features specified in the claims. Advantageous embodiments of the present invention are specified in the dependent claims.

According to the invention, increased protection against unauthorized use of resources provided in an arithmetic unit results from the fact that, as a prerequisite for granting access to a computer-based object, a memory card comprising a program code processor and a piece of license information are provided. At least one public and private key that is allocated to the memory card as well as a public key of a trustworthy entity are stored on said memory card. The piece of license information comprises at least one license code which is encoded by means of the public key allocated to the memory card and is provided on an arithmetic unit that controls access to the computer-based object. The encoded license code and a declaration, digitally signed by means of the private key of the trustworthy entity, of a function to be executed by the memory card for decoding the license code are transmitted to the memory card. The digital signature of the declaration of the function to be executed by the memory card is subsequently checked. If the result of the check is positive, the function for decoding the license code is executed by the memory card and a decoded license code is transmitted to the arithmetic unit. The decoded license code is then provided at least temporarily for accessing the computer-based object.

'Arithmetic unit' is understood to refer without restricting the universality of this term, for example, to PCs, notebooks, servers, PDAs, mobile telephones, automatic cash dispensers, control modules in automation engineering, automotive engineering, communication engineering or medical engineering—in general, to devices in which computer programs can run. Furthermore, computer-based objects are understood to refer without restricting the universality of this term to operating systems, control or application programs, services, performance features, functions or procedures provided by operating systems, control programs or application programs, access rights to peripheral devices and data located on a storage medium.

According to an advantageous development of the present invention, the public key of the trustworthy entity is provided, protected against manipulation, on the arithmetic unit. Furthermore, the piece of license information is digitally signed by means of a private key of the trustworthy entity. The digital signature of the piece of license information can consequently be checked in the arithmetic unit with the aid of the public key of the trustworthy entity. In this way, a trustworthy and secure transmission of the piece of license information to the arithmetic unit can be ensured.

Advantageously, the piece of license information additionally comprises the public key allocated to the memory card. Furthermore, the decoded license code is digitally signed by means of the private key allocated to the memory card. The digital signature of the decoded license code can then be checked in the arithmetic unit with the aid of the public key allocated to the memory card. This offers the advantage of a secure transfer of the decoded license code to the arithmetic unit, coupled with the safeguard that the license code has actually been decoded using the memory card provided for decoding.

In addition, the declaration, digitally signed by means of the private key of the trustworthy entity, of the function to be executed by the memory card for decoding the license code can be generated in the arithmetic unit from the encoded license code and a signature object. The signature object comprises only a signature portion of a function call, signed by the trustworthy entity, for decoding the license code. This embodiment offers the advantage that available secure-messaging methods can be used for a transmission of a corresponding function call. Furthermore, the piece of license information can additionally comprise the signature object so a secure provision of the signature object can be ensured.

According to a further advantageous embodiment of the present invention, the encoded license code and the declaration, digitally signed by means of the private key of the trustworthy entity, of the function to be executed by the memory card are transmitted over a secure communication link from the arithmetic unit via a reading device to the memory card. In this way, opportunities for manipulation in order to achieve access to the computer-based object in an unauthorized manner are further restricted.

Advantageously, the digital signature of the declaration of the function to be executed by the memory card is checked with the aid of the public key of the trustworthy entity. This serves to prevent an unauthorized decoding of the license code.

According to a further embodiment of the present invention, a random number is generated in the arithmetic unit and said random number transmitted to the memory card. The decoded license code is then digitally signed by means of the private key allocated to the memory card and by means of the random number. The digital signature of the decoded license code is finally checked in the arithmetic unit with the aid of the public key allocated to the memory card and with the aid of the random number. By this means, an effective duplication protection is produced so that an interception of signals exchanged between the memory card and the arithmetic unit does not open up any opportunities for manipulation.

According to a preferred embodiment of the present invention, for access to be granted to the computer-based object, the decoded license code and progress of a checking process are compared with a respective set default. This offers additional security since presence of the decoded license code alone is no longer sufficient for access authorization but is coupled to successful progress of a checking process.

BRIEF DESCRIPTION OF THE DRAWINGS

The present invention will be explained in detail below with reference to an exemplary embodiment with the aid of the drawing.

The FIGURE shows a diagrammatic representation of an application environment of the present invention comprising an exchange of pieces of information and messages between a trustworthy entity, an arithmetic unit that controls access to a computer-based object and a memory card comprising a program code processor.

DETAILED DESCRIPTION OF THE INVENTION

The application environment of the present invention represented in the FIGURE comprises a trustworthy entity 10, a computer 20, a smartcard terminal 30 connected to the computer 20, in which smartcard terminal a smartcard 40 can be inserted. The trustworthy entity 10 can, for example, be allocated to a manufacturer of software to be protected against unauthorized access and takes over the administration of licenses and of smartcard-allocated key material. Also allocated to the trustworthy entity 10 is an asymmetrical key pair 11 comprising a private and a public key. In order to store the smartcard-allocated key material, a database 12 is provided which contains public keys of smartcards which are to be delivered or which have already been delivered.

System resources 22, comprising, for example, programs or memory areas with data, are made available by the computer 20 for one or more users. The method described here for granting access to a computer-based object is in principle applicable to any system resources. The computer 20 controls in particular access to the system resources 22, which in the present case also comprise software of the manufacturer to which the trustworthy entity 10 is allocated. Furthermore, the public key 21 of the trustworthy entity 10 is provided, protected against manipulation, on the computer 20.

The smartcard terminal 30 is connected to the computer 20 over a secure communication link. The smartcard terminal 30 serves in the exchange of information and messages between the computer 20 and a smartcard 40 which can be inserted in the smartcard terminal 30 and which constitutes a memory card comprising a program code processor. The public key 41 of the trustworthy entity 10 as well as an asymmetrical key pair 42 allocated to the smartcard 40, the asymmetrical key pair comprising a public and a private key of the smartcard 40, are stored on the smartcard 40. In addition, at least one program is provided on the smartcard 40 for encoding and decoding using the asymmetrical key pair 42 of the smartcard 40 and for verifying signatures generated by means of the private key of the trustworthy entity 10. The verification of signatures is effected with the aid of the public key 41 of the trustworthy entity 10. In addition, the smartcard 40 has a random number generator and preferably conforms to IFO 7816/4.

A piece of license information 1 created by the trustworthy entity 10 is provided on the computer 20. The piece of license information 1 comprises a license code encoded by means of the public key allocated to the smartcard 40 (enc_SC(licence-code)), the public key (pub_SC) allocated to the smartcard 40 and a signature object (DS_Object). The signature object comprises only a signature portion of a function call (PSO_DEC—perform security operation mode decrypt) signed by the trustworthy entity 10 for decoding the license code by means of the smartcard 40. Furthermore, the piece of license information 1 is digitally signed (sig_TP) by means of the private key of the trustworthy entity 10, so the digital signature of the piece of license information 1 can be checked in the computer 20 with the aid of the public key 21 of the trustworthy entity 10.

In order to achieve duplication protection for the exchange of information and messages between the computer 20 and the smartcard terminal 30 or the smartcard 40, a random number (rand) is generated in the computer 20 and this random number transmitted by means of a message 2 to the smartcard 40 (give-random). The receipt of the random number is acknowledged by the smartcard 40 by means of a confirmation message 3. A message 4 for decoding the license code is subsequently transmitted from the computer 20 to the smartcard 40. The message 4 for decoding the license code comprises a declaration, digitally signed by means of the private key of the trustworthy entity 10, of a function to be executed by the smartcard 40 for decoding the license code including the encoded license code.

The declaration, digitally signed by means of the private key of the trustworthy entity 10, of the function to be executed by the smartcard 40 for decoding the license code is generated in the computer 20 from the signature object which the piece of license information 1 comprises and from the encoded license code. In this way, a secure-messaging command (SM_ sig_TP) signed by the trustworthy entity 10 is created by the computer 20 on behalf of the trustworthy entity 10, by which means it is ensured that the declaration of the function to be executed by the smartcard 40 for decoding the license code and the encoded license code have actually been issued by the trustworthy entity 10.

A check by the smartcard 40 of the digital signature of the declaration of the function to be executed by the smartcard 40 and of an execution of the function for decoding the license code by the smartcard 40. If the result is positive, for protection against attempts at manipulation through formation of a shared functional context linked with one another. In particular, it is ensured that decoding of the license code is possible only by a smartcard provided for the purpose.

After execution of the function for decoding the license code (perform security operation mode decrypt, applied to the license code encoded by means of the public key allocated to the smartcard 40) and decoding, the decoded license code is transmitted using secure messaging by means of a message 5 to the computer 20. In order to use secure messaging, the decoded license code is digitally signed by means of the private key allocated to the smartcard 40 and by means of the random number generated by the computer 20 (SM_rand_sig_SC). After transmission to the computer 20, the digital signature of the decoded license code is checked by the computer 20 with the aid of the public key allocated to the memory card and with the aid of the random number. In principle, it would suffice to digitally sign the decoded license code solely by means of the private key allocated to the smartcard 40 and to check the digital signature with the aid of the public key of the smartcard 40. However, this would mean foregoing the duplication protection. Appropriate measures can therefore be weighed up accordingly depending on application cases and security requirements.

After the digital signature of the decoded license code has been checked, said license code is provided at least temporarily for accessing the protected software or a computer-based object. In order to rule out conceivable opportunities for manipulation, the decoded license code and progress of a checking process should be matched with a respective set default before access is granted to the protected software. If the match is successful, then access can be granted.

Control of the sequence of the method for granting access to protected software or a computer-based object is implemented through a control program which can be loaded in a working memory of the computer 20 and has at least one code section, execution of which prompts firstly a transmission to a memory card of a license code encoded by means of a public key allocated to said memory card comprising a program code processor and of a declaration, digitally signed by means of a private key of a trustworthy entity, of a function to be executed by said memory card for decoding said license code. Furthermore, upon execution of the code section, a check is prompted by the memory card of the digital signature of the declaration of the function to be executed by the memory card. The digital signature of the declaration of the function to be executed by the memory card is checked with the aid of the public key of the trustworthy entity. If the result of the check is positive, an execution of the function for decoding the license code is prompted by the memory card and an encoded license code is transmitted to the computer 20. Finally, upon execution of the code section, the decoded license code is provided at least temporarily for access to the computer-based object by the computer 20 when the control program is running in the computer 20.

Application of the present invention is not restricted to the exemplary embodiment described here.

The invention claimed is:

1. A method for granting access to a computer-based object, comprising:
   providing a memory card comprising a program code processor;
   allocating a public and private key to the memory card;
   storing the public and private key allocated to the memory card on the memory card;
   storing a public key of a trustworthy entity on the memory card;
   providing license information comprising a license code encoded by the public key allocated to the memory card at an arithmetic unit that controls the access to the computer-based object;
   transmitting the encoded license code and a declaration of a function for decoding the encoded license code to be executed by the memory card which is digitally signed by a private key of the trustworthy entity to the memory card;
   checking the digital signature of the declaration of the function for decoding the encoded license code to be executed by the memory card; and
   executing a function for decoding the encoded license code by the memory card and transmitting the decoded license code to the arithmetic unit if a result of the check is a valid signature,
   wherein the decoded license code provides at least temporary access to the computer-based object.

2. The method as claimed in claim 1,
   wherein the public key of the trustworthy entity is provided and protected against manipulation at the arithmetic unit,
   wherein the license information is digitally signed by the private key of the trustworthy entity, and
   wherein the digital signature of the license information is checked in the arithmetic unit with the public key of the trustworthy entity.

3. The method as claimed in claim 1,
   wherein the license information additionally comprises the public key allocated to the memory card,
   wherein the decoded license code is digitally signed by the private key allocated to the memory card, and
   wherein the digital signature of the decoded license code is checked in the arithmetic unit with the aid of the public key allocated to the memory card.

4. The method as claimed in claim 1, wherein the declaration, digitally signed by the private key of the trustworthy entity, of the function for decoding the encoded license code to be executed by the memory card is generated in the arithmetic unit from the encoded license code and a signature object which comprises only a signature portion of a function call, signed by the trustworthy entity, for decoding the encoded license code.

5. The method as claimed in claim 1, wherein the license information additionally comprises the signature object.

6. The method as claimed in claim 1, wherein the encoded license code and the declaration, digitally signed by the private key of the trustworthy entity, of the function for decoding the encoded license code to be executed by the memory card is transmitted over a secure communication link from the arithmetic unit via a reading device to the memory card.

7. The method as claimed in claim 1, wherein the digital signature of the declaration of the function for decoding the encoded license code to be executed by the memory card is checked with the public key of the trustworthy entity.

8. The method as claimed in claim 1,
wherein a random number is generated in the arithmetic unit and transmitted to the memory card,
wherein the decoded license code is digitally signed by the private key allocated to the memory card and by the random number, and
wherein the digital signature of the decoded license code is checked in the arithmetic unit with the public key allocated to the memory card and with the random number.

9. The method as claimed in claim 1, wherein, in order to grant the access to the computer-based object, the decoded license code and progress of a checking process are matched with a respective set default.

10. The method as claimed in claim 1, wherein the computer-based object is selected from the group consisting of: operating system, control or application programs, services, performance features, functions or procedures provided by the operating system, access right to peripheral devices, and data located on a storage medium.

11. A control program loaded into a working memory of an arithmetic unit and having a code section, comprising:
a code that transmits a license code and a declaration to a memory card,
wherein the license code is encoded by a public key allocated to the memory card comprising a program code processor, and
wherein the declaration, digitally signed by a private key of a trustworthy entity, is of a function for decoding the encoded license code to be executed by the memory card;
a code that checks the digital signature of the declaration of the function for decoding the encoded license code to be executed by the memory card by the memory card; and
a code that executes a function for decoding the license code by the memory card and transmits the decoded license code to the arithmetic unit if a result of the check is a valid signature,
wherein the decoded license code provides at least temporary access to the computer-based object by the arithmetic unit.

* * * * *